(12) United States Patent  
Vashi et al.

(10) Patent No.: US 9,307,392 B2
(45) Date of Patent: Apr. 5, 2016

(54) NEGOTIATING A SESSION PERSONALITY BASED AT LEAST IN PART ON A ROAMING AGREEMENT

(71) Applicant: Apple Inc., Cupertino, CA (US)

(72) Inventors: Prashant H. Vashi, Sunnyvale, CA (US); Thanigaivelu Elangovan, Santa Clara, CA (US); Vikram Bhaskara Yerrabommanahalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/074,193

(22) Filed: Nov. 7, 2013

(65) Prior Publication Data

US 2014/0128060 A1 May 8, 2014

Related U.S. Application Data

(60) Provisional application No. 61/723,718, filed on Nov. 7, 2012.

(51) Int. Cl.
*H04W 76/02* (2009.01)
*H04W 8/12* (2009.01)
*H04W 88/06* (2009.01)

(52) U.S. Cl.
CPC ............... *H04W 8/12* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,728,536 B1 * | 4/2004 | Basilier et al. | 455/432.1 |
| 6,785,823 B1 * | 8/2004 | Abrol et al. | 726/7 |
| 7,133,670 B1 * | 11/2006 | Moll et al. | 455/432.1 |
| 8,010,150 B2 | 8/2011 | Magnusson et al. | |
| 8,045,521 B2 | 10/2011 | Godavarti et al. | |
| 8,472,946 B2 | 6/2013 | Chan et al. | |
| 8,538,430 B1 * | 9/2013 | Filiatrault et al. | 455/436 |
| 2005/0281227 A1 * | 12/2005 | Vedder et al. | 370/331 |
| 2006/0003759 A1 * | 1/2006 | Semper | 455/422.1 |
| 2006/0092878 A1 * | 5/2006 | Shirota et al. | 370/331 |
| 2006/0268907 A1 * | 11/2006 | Lee et al. | 370/401 |
| 2007/0025298 A1 * | 2/2007 | Jung | 370/331 |
| 2008/0026740 A1 * | 1/2008 | Netanel | 455/419 |
| 2010/0316029 A1 * | 12/2010 | Kappler et al. | 370/338 |
| 2012/0003958 A1 | 1/2012 | Hossain et al. | |
| 2013/0237215 A1 | 9/2013 | Vashi et al. | |
| 2014/0094142 A1 * | 4/2014 | Torres et al. | 455/411 |
| 2014/0241324 A1 * | 8/2014 | Jang et al. | 370/332 |

* cited by examiner

*Primary Examiner* — Kimberly A Williams
(74) *Attorney, Agent, or Firm* — Downey Brand LLP

(57) ABSTRACT

A method for negotiating a session personality based at least in part on a roaming agreement is provided. The method can include a roaming access network receiving an identifier provided by an access terminal attendant to establishment of a session between the access terminal and the roaming access network. The method can further include the roaming access network using the identifier to determine a home network associated with the access terminal. The method can additionally include the roaming access network determining one or more radio access technology (RAT) versions covered by a roaming agreement between the home network and the roaming access network. The method can also include the roaming access network negotiating a session personality for use in the session based at least in part on the one or more RAT versions covered by the roaming agreement.

20 Claims, 8 Drawing Sheets

NEGOTIATING A SESSION PERSONALITY BASED AT LEAST IN PART ON A ROAMING AGREEMENT

CROSS-REFERENCE TO RELATED APPLICATION

This application claims the benefit of priority from U.S. Provisional Patent Application No. 61/723,718, filed on Nov. 7, 2012, which is hereby incorporated herein by reference in its entity.

FIELD

The described embodiments relate generally to wireless communications. More particularly, the present embodiments relate to negotiating a session personality based at least in part on a roaming agreement.

BACKGROUND

As wireless access terminals and wireless communication networks continue to evolve, there are now several concurrently deployed radio access technologies (RATs). In many instances, individual RATs may also have multiple concurrently deployed versions. Newer RATs and newer RAT versions generally offer benefits, such as faster data transfer, compared to prior RATs and prior RAT versions. Many modern access terminals have a multi-mode capability, and can connect to a network using multiple RATs and/or multiple versions of one or more RATs. Likewise, many radio access networks support multiple RATs and/or multiple versions of one or more RATs. As such, when an access terminal establishes a session with a radio access network, the access terminal and radio access network can negotiate a session personality defining one or more RAT versions (e.g., one or more particular RATs and/or one or more particular versions thereof) to use during the session.

Wireless operators typically have roaming agreements with operators in different countries to enable accessibility of voice, data and other supplementary services for their subscribers when they travel internationally. Roaming agreements can be between operators that use the same underlying RAT or between operators using different underlying RATs. For example, a Third Generation Partnership Project 2 (3GPP2) (CDMA2000 and HRPD) operator using CDMA2000 and/or High Rate Packet Data (HRPD) RATs can have roaming relationships with other 3GPP2 operators and/or with a Third Generation Partnership Project (3GPP) operator that can use Global System for Mobile Communications (GSM), Universal Mobile Telecommunications System (UMTS), and/or Long Term Evolution (LTE) RATs.

Cross technology agreements often require that an access terminal support multiple technologies. Terminals that support multiple technologies are referred to as multi-mode devices. However, a multi-mode device is typically not inherently entitled to service in any country to which a user travels. Instead, a roaming agreement between the operator of the terminal's home network and the operator of the roaming access network is typically required.

If the roaming access network and an access terminal negotiate a session personality allowing use of a RAT version that is not covered in the roaming agreement between the operator of the roaming access network and the operator of the home network of the access terminal, several problems can result. For example, in some instances, if a RAT version that is not covered by the roaming agreement is a preferred RAT version that is supported by both the access terminal and the roaming access network, the access terminal may become stuck in a loop in which the access terminal and roaming access network may negotiate to use the RAT version in a session and then experience session failure due to lack of support for the RAT version in the roaming agreement. As another example, in some instances, if an access terminal and roaming access network negotiate a session personality in which a first RAT version, which is not covered by the roaming agreement, and which provides faster data rates than a second RAT version that is covered by the roaming agreement, the roaming access network may essentially give away additional bandwidth and/or other services for which the roaming access network may not be compensated by the home network.

SUMMARY

Some example embodiments disclosed herein provide for negotiating a session personality based at least in part on a roaming agreement (e.g., an inter-carrier roaming agreement). More particularly, a roaming access network in accordance with some example embodiments can discover a roaming access terminal's home network during session establishment such that the roaming access network can determine the applicable roaming agreement and negotiate a session personality appropriate to the technologies (e.g., RAT versions) covered under the inter-carrier roaming agreement. In this regard, the RAT version(s) that may be negotiated for use in a session in accordance with such embodiments may include one or more RAT versions that are supported by both the access terminal and the roaming access network, and which are covered by the roaming agreement. Accordingly, access terminal users can benefit from not being stuck in endless loops that might otherwise occur if a negotiated session personality including a RAT version that is not covered by the roaming agreement is negotiated and used in the session. Similarly, network operators can benefit in roaming scenarios by not giving away more resources to roaming access terminals than covered under a roaming agreement.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
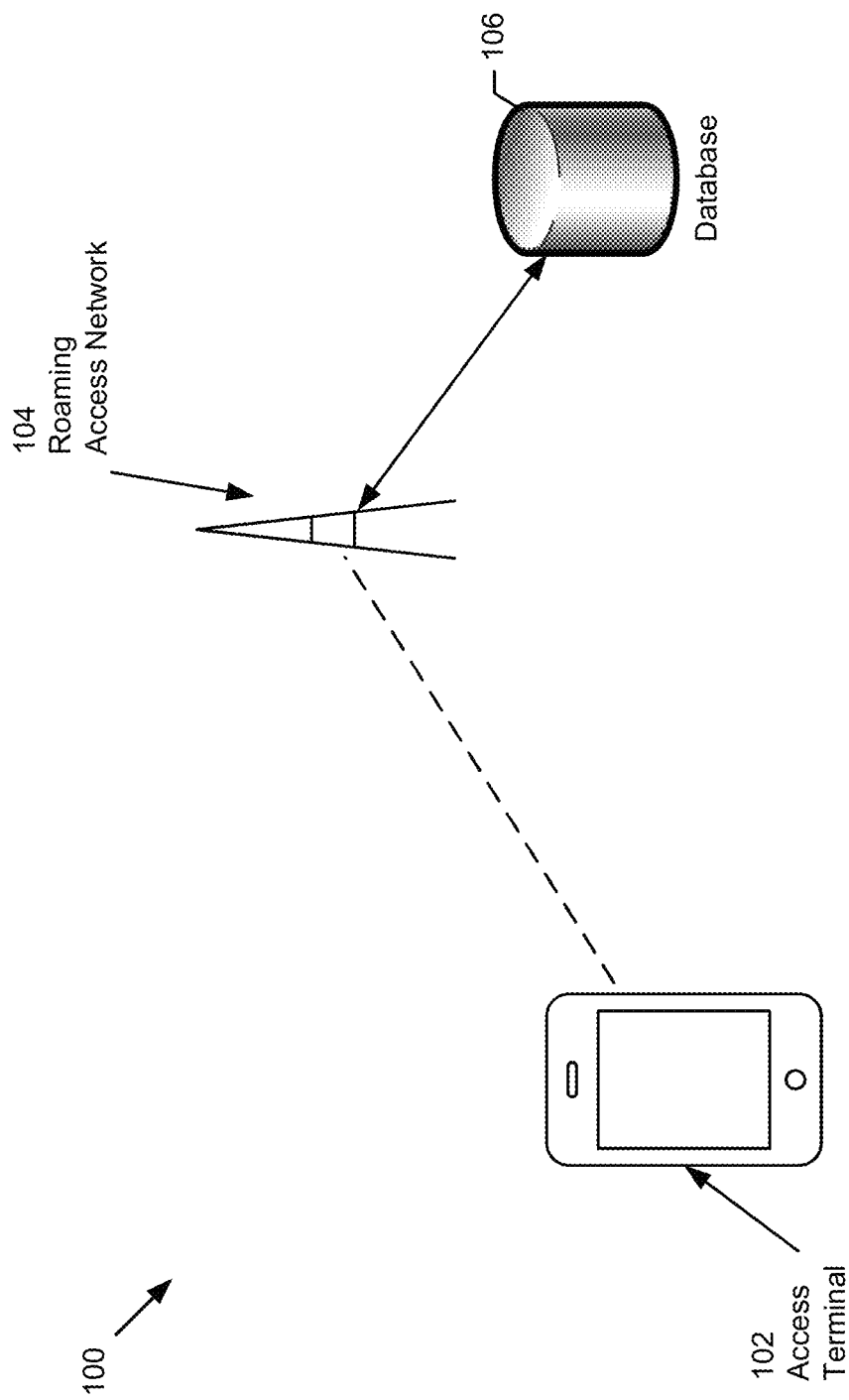
FIG. 1 illustrates a wireless communication system in accordance with some example embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some operators that have deployed both 3GPP2 and 3GPP technologies have upgraded their 3GPP2 Evolution-Data Optimized (EV-DO) networks to support evolved HRPD (eHRPD), which is an evolved, or enhanced, version of HRPD. eHRPD deployment enables an operator to provide the rich services that are enabled by deployment of evolved packet core (EPC). EPC is a part of the Evolved Packet System (EPS) as defined by 3GPP.

An access terminal that is within 3GPP2 (CDMA/EV-DO) coverage and supports eHRPD can advertise its capabilities, and the network can negotiate an eHRPD capable EV-DO session with the terminal. As such, the access terminal can access services provide by the EPC.

However, many 3GPP2 operators who are deploying 3GPP LTE as their fourth generation (4G) technology and have upgraded their 3GPP2 EV-DO networks to support eHRPD do not have roaming agreements that support eHRPD for roaming access terminals. In this regard, there is often no connectivity between the EPCs of roaming partners. Future deployments may have EPC connectivity between roaming partners to support LTE roaming, but eHRPD support while roaming may still be questionable. As such, session establishment negotiation between an access terminal and roaming access network can result in a problematic state in which eHRPD usage may be negotiated for the session but eHRPD is not supported by a roaming agreement with the terminal's home network. In this regard, the roaming access network can, in some instances, only negotiate a single personality—an eHRPD personality—when the access terminal advertises eHRPD capability. This single personality typically prevents a fallback to HRPD personality and hence hinders third generation (3G) roaming if the roaming access network does not have eHRPD roaming support within the context of the inter-carrier roaming agreement with the home network. In the case where a roaming access network does negotiate a multiple personality session which also includes eHRPD, the roaming access network can still commit to using the eHRPD personality for communication, and due to infrastructure limitations the roaming access network cannot switch to a non-eHRPD personality if the roaming access network finds that an eHRPD roaming support does not exist. As such, a roaming access terminal can remain stuck in an endless loop where the roaming access network negotiates an eHRPD capable session and commits to using eHRPD, but closes the session after realizing that eHRPD roaming support does not exist.

Additionally, some roaming access network operators can support a more recent version of a RAT, such as EV-DO Revision (Rev.) B (e.g., EV-DO Multi-Carrier aggregation technology), but can have in-bound roaming agreements with home network operators that support a legacy older version of the RAT, such as EV-DO Rev. A, but that do not support EV-DO Rev. B. However, access terminals sold by such home network operators can be capable of supporting EV-DO Rev. B, which can result in conflicts when such access terminals are establishing a session on roaming access networks supporting EV-DO Rev. B, as the applicable in-bound roaming agreement may not cover EV-DO Rev. B and the roaming access network may provide a roaming access terminal with a higher data rate than that for which the roaming access network may be compensated for under the terms of the in-bound roaming agreement. In this regard, a roaming access terminal can advertise its EV-DO Rev. B capability on the roaming access network, and the roaming access network can negotiate an EV-DO Rev. B session personality. While a user of the access terminal may not be affected, as the roaming access network would be offering higher bandwidth from the capacity of roam network, the roaming access network operator may not be compensated for the higher bandwidth due to the roaming agreement not covering EV-DO Rev. B. Additionally, by allocating higher bandwidth through the more advanced RAT version to the roaming access terminal, the roaming access network may tie up limited bandwidth resources that might otherwise be allocated to another access terminal.

Example embodiments disclosed herein can address the foregoing and other problematic scenarios by providing for negotiation of a session personality based at least in part on a roaming agreement, such as an inter-carrier roaming agreement. In this regard, some example embodiments benefit access terminals and access terminal users by avoiding the possibility of an access terminal being stuck in an endless session failure loop by negotiating a session personality in accordance with the technologies (e.g., RAT versions) covered in the applicable roaming agreement. Further, some example embodiments benefit network operators, as network operators may avoid negotiating a session personality with a roaming access terminal that provides services beyond those covered in the applicable roaming agreement. As such, a network operator can ensure that it will be appropriately compensated under terms of the roaming agreement for services provided to a roaming access terminal.

More particularly, some example embodiments provide for discovery of a roaming access terminal's home network during session establishment such that the roaming access network can determine the applicable inter-carrier roaming agreement and negotiate a session personality appropriate to the RAT versions covered under the inter-carrier roaming agreement. Thus, for example, an appropriate EV-DO session personality (e.g., support for one or more of EV-DO Rel. 0, EV-DO Rev. A, EV-DO Rev. B, EV-DO Rev. C, eHRPD, and/or the like) can be negotiated during session establishment in accordance with some example embodiments. It will be appreciated, however, that various embodiments are not limited to negotiation of an appropriate EV-DO session personality for a roaming terminal. In this regard, some example embodiments can be applied to any context in which a RAT version(s) for use during a session is negotiated between an access terminal and roaming access network. For example, some example embodiments support negotiation of an LTE technology (e.g., LTE, LTE-Advanced, various releases thereof, and/or the like) session personality based at least in part on an inter-carrier roaming agreement. As a further example, some example embodiments support negotiation of a session personality in accordance with a release version(s) of a RAT, such as UMTS, LTE, CDMA, and/or other RAT in accordance with release versions covered under an inter-carrier, or other, roaming agreement. As such, it will be appreciated that where example embodiments are described herein by way of example with respect to EV-DO session establishment, techniques and operations described with respect to those examples may be applied mutatis mutandis to negotiation of a session personality defining RAT versions for use in a session during establishment of other types of wireless network sessions within the scope of the disclosure.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 illustrates an example system 100 having an access terminal 102 that can access a roaming access network 104 in accordance with some example embodiments. By way of non-limiting example, the access terminal 102 can be a cellular phone, such as a smart phone device, a tablet computing device, a laptop computing device, or other computing device configured to access the roaming access network 104, such as via a base station or other wireless network access point. The access terminal 102 can be associated with a home network and can access the roaming access network 104 when roaming in a territory served by the roaming access network 104.

The roaming access network 104 can include a radio access network (RAN) that can implement one or more RATs that can enable the access terminal 102 to wirelessly access the roaming access network 104. In this regard, the roaming access network 104 can include a cellular base station, such as an evolved node B (eNB), node B, base transceiver station (BTS), and/or any other type appropriate type of base station depending on the RAT(s) implemented by the roaming access network 104. The roaming access network 104 can further include one or more further entities, such as a base station controller (BSC), radio network controller (RNC), and/or other entities that can support operation of a radio access network. The roaming access network 104 can additionally include or otherwise be interfaced with a core network portion.

The roaming access network 104 can support any of a variety of RAT versions. For example, the roaming access network 104 can support one or more EV-DO technologies, such as EV-DO Rel. 1, EV-DO Rev. A, EV-DO Rev. B, EV-DO Rev. C, eHRPD, and/or other present or future developed EV-DO version or technology. As a further example, the roaming access network 104 can support one or more LTE versions, such as one or more LTE release versions, one or more LTE-Advanced (LTE-A) release versions, and/or the like. Additionally or alternatively, the roaming access network 104 can support one or more release versions of one or more other RATs. For example, the roaming access network 104 can support one or more second generation (2G) RATs, such as one or more release versions of Global System for Mobile Communications (GSM) technology. As another example, the roaming access network 104 can support one or more third generation (3G) RATs, such as one or more release versions of Wideband Code Division Multiple Access (WCDMA) technology or other Universal Mobile Telecommunications System (UMTS) technology, such as Time Division Synchronous Code Division Multiple Access (TD-SCDMA) technology. As a further example, the roaming access network 104 can support one or more versions of a CDMA2000 technology, such as 1xRTT technology, or other technology standardized by the Third Generation Partnership Project 2 (3GPP2). As still another example, the roaming access network 104 can support one or more release versions of a fourth generation (4G) RAT other than LTE, such as WiMAX, one or more release versions of a fifth generation (5G) RAT, and/or one or more versions of a further existing and/or future developed RAT.

As the roaming access network 104 can support a plurality of RAT versions (e.g., a plurality of different RATs and/or a plurality of versions of a respective RAT(s)), when the access terminal 102 establishes a session on the roaming access network 104, the roaming access network 104 and access terminal 102 can negotiate a session personality for the session that can define one or more RAT versions to be used for the session. In accordance with some example embodiments, as will be described further herein below, negotiation of the session personality can be performed by the roaming access network 104 in accordance with a roaming agreement between the roaming access network 104 and a home network that can be associated with the access terminal 102. For example, in some embodiments, the roaming agreement may be an inter-carrier roaming agreement between an operator of the roaming access network 104 and an operator of the home network. Additionally or alternatively, in some embodiments, the roaming agreement may be an international roaming agreement between the home network and/or an operator thereof, which may be based in a first country, and the roaming access network 104 and/or an operator thereof, which may be based in a second country, which a user of the access terminal 102 may be visiting.

In some example embodiments, the system 100 may further include a database 106 that may be maintained by and/or that may otherwise be accessible by the roaming access network 104. The database 106 may include a database of identifiers, such as a hardware identifier (HardwareID) and/or other identifier, associated with access terminals, such as access terminal 102, and the respective home networks associated therewith. As such, in embodiments including the database 106, the roaming access network 104 may use an identifier associated with access terminal 102 to look up the access terminal 102 in the database 106 and determine the home network associated with the access terminal 102. The roaming access network 104 can accordingly determine the appropriate roaming agreement applicable to the access terminal 102 when establishing a session with the access terminal 102 and negotiate a session personality accordingly.

In some example embodiments including a database 106, the database 106 may be maintained by the roaming access network 104. For example, the roaming access network 104 may collect records of access terminal identifiers and associated home networks from other network operators and/or from access terminals using the roaming access network 104. Alternatively, in some example embodiments, the database 106 can be maintained external to the roaming access network 104 (e.g., a centralized database) and can be accessed by multiple network operators. For example, in such embodiments, multiple carriers can pool records of access terminal identifiers in the database 106 such that a home network for a roaming access terminal, such as access terminal 102, can be determined by a roaming access network, such as roaming access network 104, providing access to the roaming access terminal. It will be appreciated, however, that the database 106 is optional and can be omitted in some embodiments.

Figure 2:
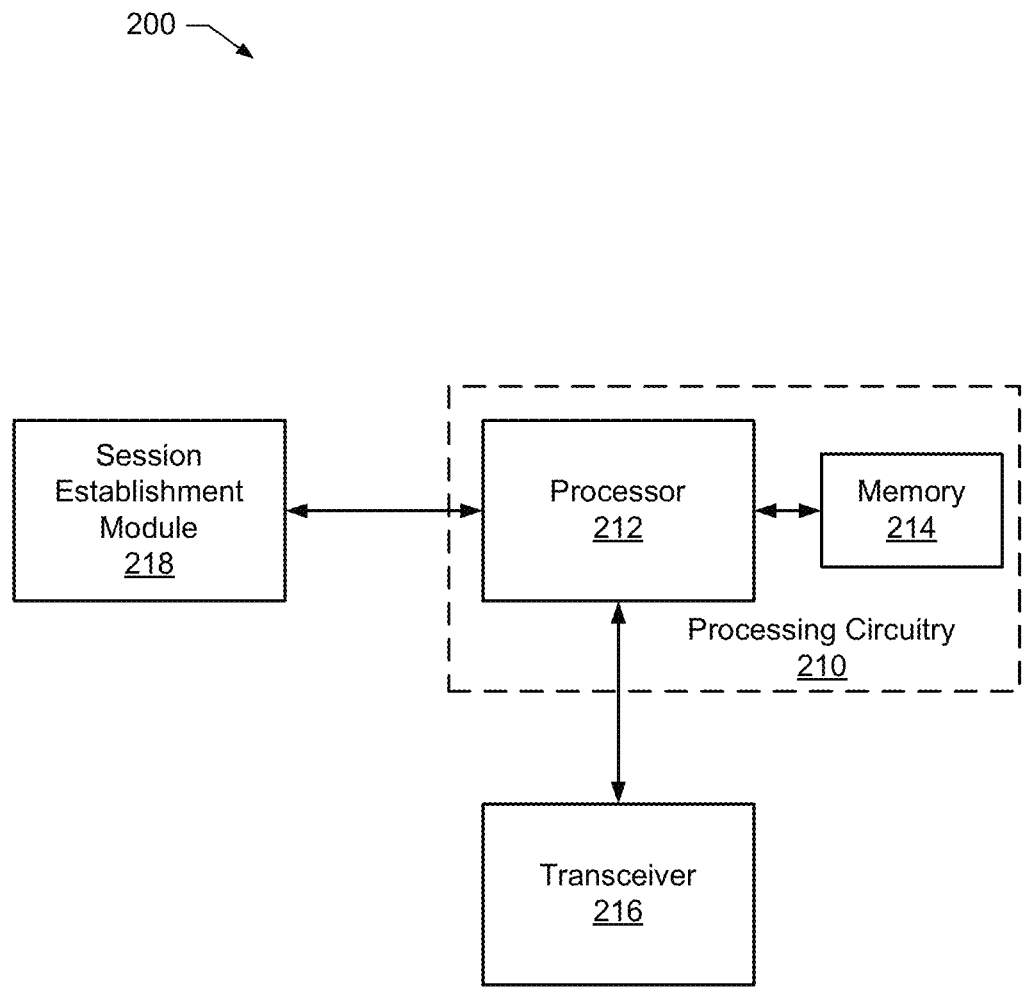
FIG. 2 illustrates a block diagram of an apparatus that can be implemented on an access terminal in accordance with some example embodiments.

FIG. 2 illustrates a block diagram of an apparatus 200 that can be implemented on an access terminal 102 in accordance with some example embodiments. In this regard, when implemented on a computing device, such as access terminal 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to establish a session with the roaming access network 104. In some such embodiments, the apparatus 200 can be embodied as or otherwise include a cellular baseband chipset.

In some example embodiments, the processing circuitry 210 can include a processor 212 and, in some embodiments, such as that illustrated in FIG. 2, can further include memory 214. The processing circuitry 210 can be in communication with or otherwise control a transceiver 216 and/or session establishment module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver 216, or session establishment module 218 via a bus(es) for passing information among components of the apparatus 200.

The apparatus 200 can further include transceiver 216. The transceiver 216 can enable the apparatus 200 to send wireless signals to and receive signals from one or more wireless networks. As such, the transceiver 216 can be configured to support communication between the access terminal 102 and the roaming access network 104 in accordance with a RAT(s) that can be supported by the roaming access network 104.

The apparatus 200 can further include session establishment module 218. The session establishment module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the session establishment module 218. The session establishment module 218 can be configured to detect presence of the roaming access network 104 and support establishment of a session, including session personality negotiation, on behalf of the access terminal 102.

Figure 3:
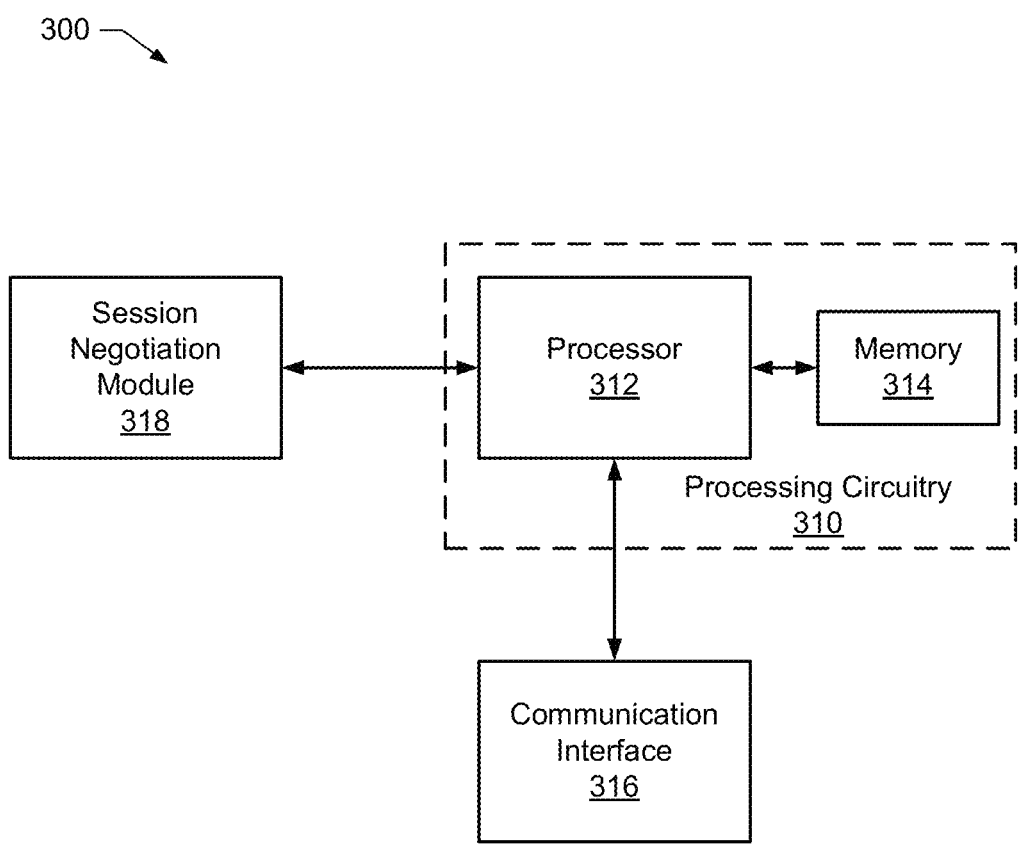
FIG. 3 illustrates a block diagram of an apparatus that can be implemented on a roaming access network entity in accordance with some example embodiments.

FIG. 3 illustrates a block diagram of an apparatus 300 that can be implemented on a roaming access network entity that can be implemented on the roaming access network 104 in accordance with some example embodiments. For example, the apparatus 300 can be implemented on one or more network entities that can form a portion of a radio access network that can support operation of the roaming access network 104. In this regard, by way of non-limiting example, the apparatus 300 can be implemented on one or more base stations (e.g., a node B, eNB, base transceiver station, and/or other base station), a BSC, RNC, and/or other radio access network entity. Additionally or alternatively, the apparatus 300 can be implemented on one or more core network entities that can be included in the roaming access network 104. As such, it will be appreciated that the apparatus 300 can comprise an apparatus that can be implemented on a single network entity, or can form a distributed apparatus that can be distributed across a plurality of network entities.

It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing session establishment functionalities of the roaming access network 104 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset.

In some example embodiments, the processing circuitry 310 can include a processor 312 and, in some embodiments, such as that illustrated in FIG. 3, can further include memory 314. The processing circuitry 310 can be in communication with or otherwise control a communication interface 316 and/or session negotiation module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In embodiments including a plurality of processors, the processors can be implemented on a single computing device, or can be distributed across a plurality of computing devices that can be collectively configured to provide functionality of the apparatus 300 in accordance with some example embodiments. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. In embodiments including multiple memory devices, the memory devices can be implemented on a single computing device, or can be distributed across a plurality of computing devices that can be collectively configured to provide functionality of the apparatus 300 in accordance with some example embodiments. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, communication interface 316, or session negotiation module 318 via a bus(es) for passing information among components of the apparatus 300.

The apparatus 300 can further include a communication interface 316. The communication interface 316 can be configured to enable the apparatus 300 to communicate with one or more access terminals 102. For example, the communication interface 316 can include a transceiver(s) enabling communication with one or more access terminals 102 in a cell that can be served by a base station on which the apparatus 300 can be at least partially implemented. The communication interface 316 can additionally or alternatively include one or more interface mechanisms for enabling communication with other devices and/or networks. As such, the communication interface 316 can include, for example, an antenna (or multiple antennas) and supporting hardware and/or software for enabling communications with a wireless communication network (e.g., a cellular network, WSN, and/or the like) and/or a communication modem or other hardware/software for supporting communication via cable, digital subscriber line (DSL), universal serial bus (USB), Ethernet or other wireline networking methods.

The apparatus 300 can further include session negotiation module 318. The session negotiation module 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the session negotiation module 318. The session negotiation module 318 can be configured to support negotiation of a session personality based at least in part on a roaming agreement in accordance with one or more example embodiments.

A session, such as an EV-DO session can include a negotiated set(s) of protocol subtypes, application subtypes, parameters, and values defined for an access terminal 102 for the duration of the session by the Access Network (AN) (e.g., the roaming access network 104) for a given subnet. Because of evolving EV-DO networks and the coexistence of older access terminals (e.g., access terminals capable of supporting EV-DO Rel. 0 or Rev. A) with newer access terminals (e.g., access terminals capable of supporting EV-DO Rev. B, EV-DO Rev. C, and/or eHRPD), EV-DO networks/systems can facilitate negotiation of multiple sets of protocol subtypes, application subtypes, parameters, and values in a process that can be called Multiple Personality Negotiation.

A session, such as n EV-DO session, can be established between the access terminal 102 and roaming access network 104 in response to discovery of the roaming access network 104 by the access terminal 102. Session establishment can include three phases: (1) session setup, (2) session negotiation, and (3) session authentication. In accordance with some example embodiments, the session negotiation module 318 can be configured to use an identifier associated with the access terminal 102 that can be provided to the roaming access network 104 by the access terminal 102 attendant to session establishment to identify a home network that can be associated with the access terminal 102. By way of non-limiting example, the identifier can be a hardware identifier (hardware ID) for the access terminal, network access identifier (NAI), and/or other identifier that can be associated with the access terminal 102. The session negotiation module 318 can use the home network to identify a roaming agreement, such as an inter-carrier roaming agreement between an operator of the roaming access network 104 and an operator of the home network, such that a session personality can be negotiated based at least in part on the RAT version(s) covered by the roaming agreement.

Figure 4:
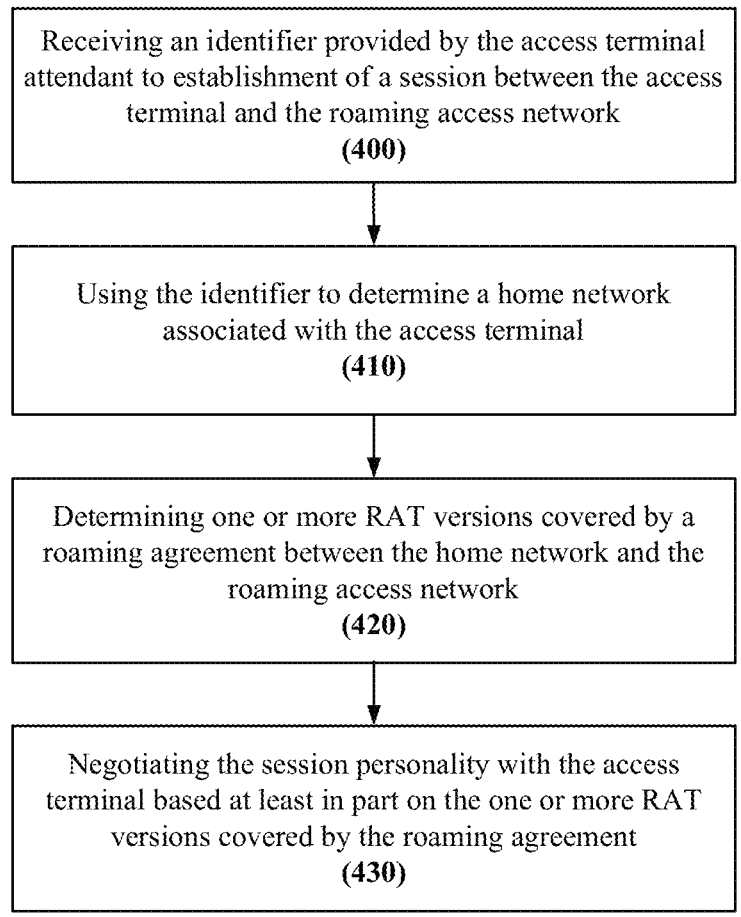
FIG. 4 illustrates a flowchart of an example method for negotiating a session personality based at least in part on a roaming agreement according to some example embodiments.

FIG. 4 illustrates a flowchart of an example method for negotiating a session personality based at least in part on a roaming agreement according to some example embodiments. In this regard, FIG. 4 illustrates operations that can be performed by one or more network entities of the roaming access network 104 in accordance with some embodiments. One or more of processing circuitry 310, processor 312, memory 314, communication interface 316, or session negotiation module 318 can, for example, provide means for performing one or more of the operations illustrated in and described with respect to FIG. 4.

Operation 400 can include the roaming access network 104 receiving an identifier provided by the access terminal 102 attendant to establishment of a session between the access terminal 102 and the roaming access network 104. For example, in some embodiments, such as those illustrated in and described below with respect to FIGS. 5 and 6, the received identifier can be a HardwareID associated with the access terminal 102 that can be provided to the roaming access network 104 by the access terminal 102 during the session setup phase of session establishment. As another example, in some embodiments, such as those illustrated in and described below with respect to FIGS. 7 and 8, the receive identifier can be a network access identifier (NAI) associated with the access terminal that can be provided to the roaming access network 104 by the access terminal 102 during the session authentication phase of session establishment. It will be appreciated however, that the identifier can be any identifier that can be used to identify the access terminal 102 and/or the home network thereof, which can be provided to the roaming access network 104 during session establishment.

Operation 410 can include the roaming access network 104 using the identifier received in operation 400 to determine a home network associated with the access terminal 102. In some example embodiments, operation 410 can include looking up the identifier in the database 106 to determine the home network. As another example, in some embodiments, such as some embodiments in which the identifier is an NAI, the identifier can include an indication of a realm (e.g., user@realm) associated with the home network such that the home network can be derived from the identifier, itself.

Operation 420 can include the roaming access network 104 determining one or more RAT versions covered by a roaming agreement between the home network and the roaming access network. In this regard, after determining the home network in operation 410, the roaming access network 104 can identify the appropriate roaming agreement and can determine one or more RAT versions covered therein.

Operation 430 can include the roaming access network 104 negotiating the session personality with the access terminal 102 based at least in part on the one or more RAT versions covered by the roaming agreement. The negotiated session personality can define one or more RAT versions for use in the session. In accordance with some example embodiments, the negotiated RAT version(s) defined by the session personality are supported by both the access terminal 102 and the roaming access network 104 and are covered by the roaming agreement. For example, in some embodiments in which the session is an EV-DO session, the negotiated RAT version(s) defined by the session personality can comprise one or more of EV-DO Rel. 0, EV-DO Rev. A, EV-DO Rev. B, EV-DO Rev. C, or eHRPD.

In some example embodiments, such as those illustrated in and described below with respect to FIGS. 5 and 6, the negotiation of operation 430 can be performed during the session negotiation phase of session establishment. As another example, in some embodiments, such as those illustrated in and described below with respect to FIGS. 7 and 8, the negotiation of operation 430 can include performance of a session modification procedure after the session authentication phase to modify a previously negotiated session personality.

In some example embodiments, a database, such as database 106, which can be accessible to the roaming access network 104, can additionally include records of RAT version support capabilities of a plurality of access terminals. In such embodiments, the roaming access network 104 can use the identifier received in operation 400 to look up RAT version support capabilities of the access terminal 102 in the database and use the RAT version support capabilities to facilitate the negotiation of operation 430.

Figure 5:
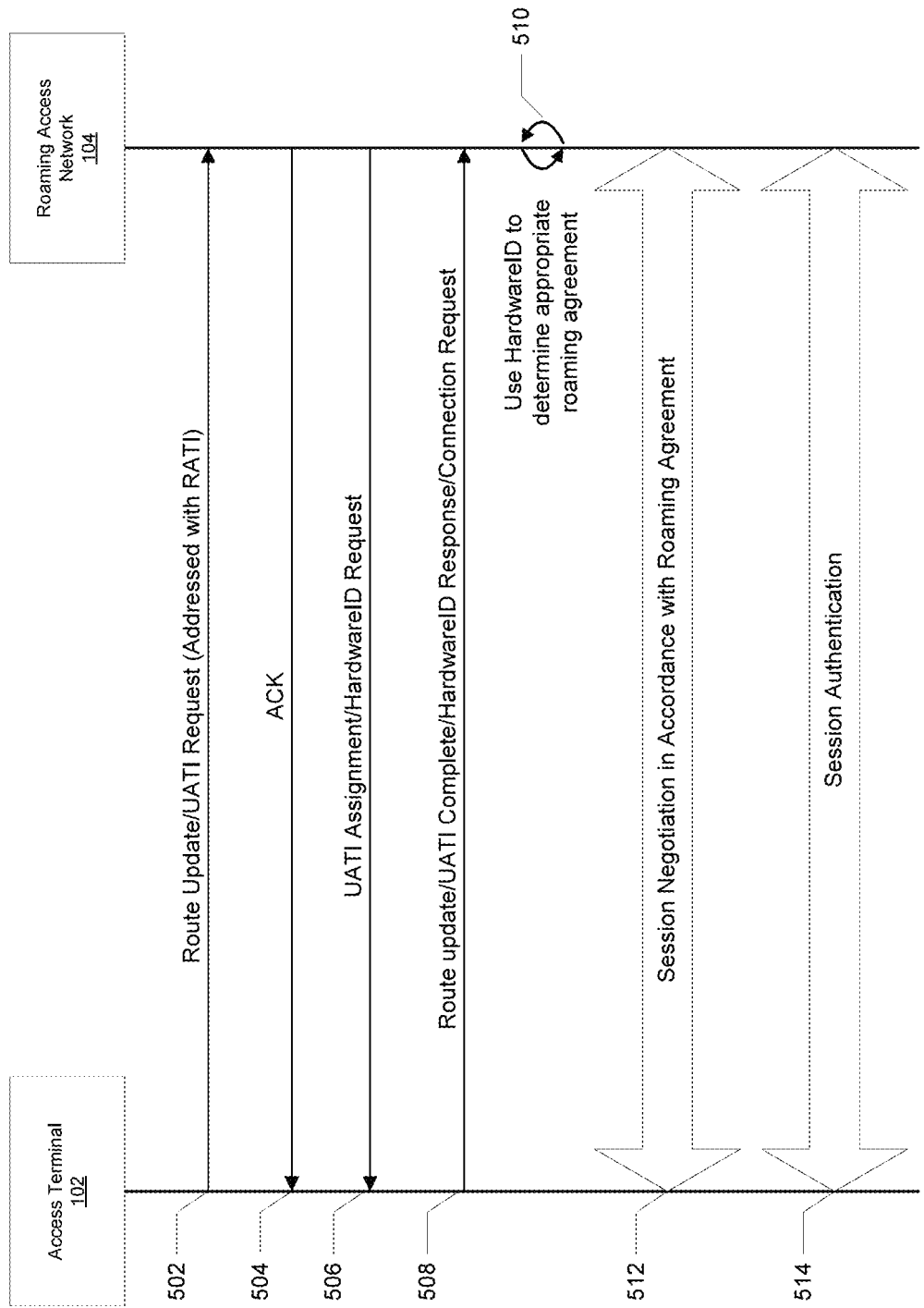
FIG. 5 illustrates a signaling diagram according to an example method for negotiating a session personality based at least in part on a roaming agreement according to some example embodiments.

FIG. 5 illustrates a signaling diagram according to an example method for negotiating a session personality based at least in part on a roaming agreement, such as an inter-carrier roaming agreement, according to some example embodiments.

Operations 502-508 can be performed attendant to a session setup phase of session establishment in which a Unicast Access Terminal Identifier (UATI) can be assigned to the access terminal 102. Operation 502 can include the access terminal 102 sending a router update/UATI request, which can be addressed with a random access terminal identifier (RATI), to the roaming access network 104. Operation 502 can, for example, be performed in response to the access terminal 102 detecting presence of the roaming access network 104. Operation 504 can include the roaming access network 104 sending an acknowledgement (ACK) to the access terminal 102 in response to the Route Update/UATI request. Operation 506 can include the roaming access network 104 sending a UATI assignment and HardwareID request to the access terminal 102.

Operation 508 can include the access terminal 102 responding with a route update/UATI complete/HardwareID Response/Connection Request. As such, operation 508 can include the access terminal 102 providing its hardware ID to the roaming access network 104. In this regard, operation 508 can correspond to an embodiment of operation 400 in which the identifier received by the roaming access network 104 is a HardwareID provided by the access terminal 102 during the session setup phase of session establishment.

Operation 510 can include the roaming access network 104 using the hardware ID provided by the access terminal 102 to determine a roaming agreement between an operator of the roaming access network 104 and the home network associated with the access terminal 102. For example, in some embodiments the roaming access network 104 can have access to a database, such as database 106, of HardwareIDs for a plurality of access terminals. The database can include records of the home networks associated with the hardware IDs. As such, the roaming access network 104 can identify the home network associated with the access terminal 102 based on the hardware ID in such example embodiments and can then determine the appropriate roaming agreement covering an agreement between the home network operator and roaming access network operator. In such embodiments, the database can, for example, be a database maintained by the roaming access network operator. Alternatively, the database can, for example, be a centralized database that can be accessed by multiple network operators. Operation 510 can accordingly correspond to an embodiment of operation 410.

Operation 512 can include the access terminal 102 and roaming access network 104 performing the session negotiation phase in accordance with the roaming agreement. In this regard, the roaming access network 104 can negotiate a session personality in accordance with the RAT version(s) covered by the roaming agreement. The roaming access network 104 can avoid negotiating a session personality for a RAT version that is not covered by the roaming agreement. Operation 512 can accordingly include performance of session personality negotiation on the basis of a roaming agreement in addition to access terminal capabilities. Operation 512 can, for example, correspond to an embodiment of operation 430. Operation 514 can include the access terminal 102 and roaming access network 104 performing session authentication to complete session establishment.

Figure 6:
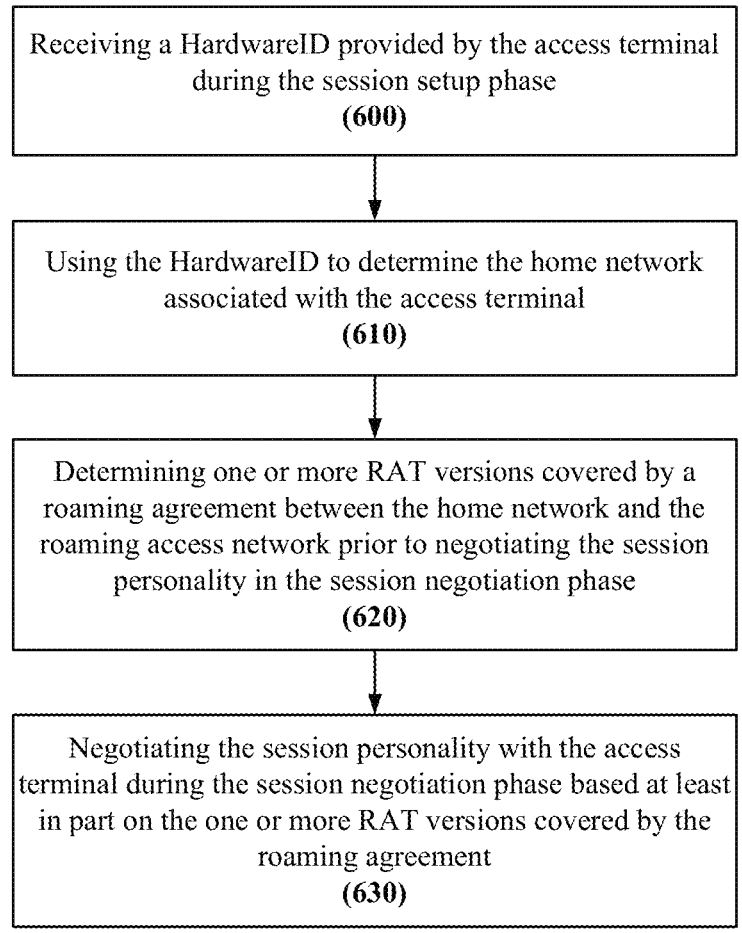
FIG. 6 illustrates a flowchart of another example method for negotiating a session personality based at least in part on a roaming agreement according to some example embodiments.

FIG. 6 illustrates a flowchart of an example method for negotiating a session personality based at least in part on a roaming agreement according to some example embodiments. In this regard, FIG. 6 illustrates operations that can be performed by one or more network entities of the roaming access network 104 in accordance with performance of the method of FIG. 5. One or more of processing circuitry 310, processor 312, memory 314, communication interface 316, or session negotiation module 318 can, for example, provide means for performing one or more of the operations illustrated in and described with respect to FIG. 6.

Operation 600 can include the roaming access network 104 receiving a HardwareID provided by the access terminal 102 during the session setup phase. In this regard, operation 600 can, for example, correspond to an embodiment of operation 400 and/or operation 508.

Operation 610 can include the roaming access network 104 using the HardwareID to determine the home network associated with the access terminal 102. In this regard, operation 610 can, for example, correspond to an embodiment of operation 410 and/or operation 510. In some example embodiments, operation 610 can include looking up the HardwareID in a database, such as database 106, to determine the home network associated with the HardwareID.

Operation 620 can include the roaming access network 104 determining one or more RAT versions covered by a roaming agreement between the home network and the roaming access network 104 prior to negotiating the session personality in the session negotiation phase. Operation 620 can accordingly correspond to an embodiment of operation 420 and/or operation 510.

Operation 630 can include the roaming access network 104 negotiating the session personality with the access terminal 102 during the session negotiation phase based at least in part on the one or more RAT versions covered by the roaming agreement. The negotiated session personality can define one or more RAT versions for use in the session. In accordance with some example embodiments, the negotiated RAT version(s) defined by the session personality are supported by both the access terminal 102 and the roaming access network 104 and are covered by the roaming agreement. Operation 630 can, for example, correspond to an embodiment of operation 430 and/or operation 512.

Figure 7:
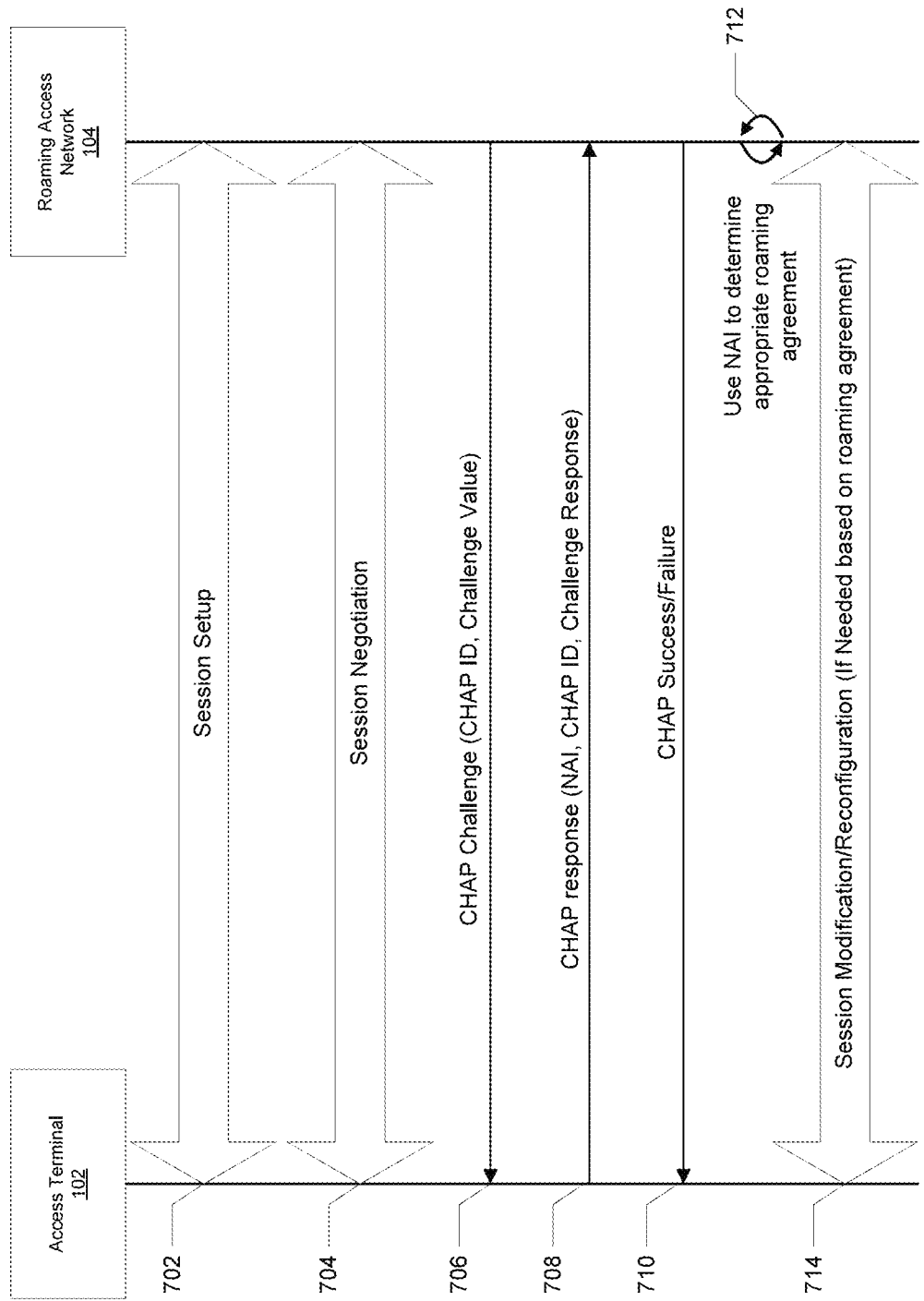
FIG. 7 illustrates a signaling diagram according to another example method for negotiating a session personality based at least in part on a roaming agreement according to some example embodiments.

FIG. 7 illustrates a signaling diagram according to another example method for negotiating a session personality based at least in part on a roaming agreement, such as an inter-carrier roaming agreement, according to some example embodiments. Operation 702 can include the access terminal 102 and roaming access network 104 performing a session setup phase of session establishment. Operation 702 can, for example, be performed in response to the access terminal 102 detecting presence of the roaming access network 104.

Operation 704 can include the access terminal 102 and roaming access network 104 performing a session negotiation phase of session establishment. Operation 704 can include negotiation of a session personality, such as based on capabilities of the access terminal 102 and roaming access network 104.

Operations 706-710 can be performed attendant to a session authentication phase of session establishment. Operation 706 can include the roaming access network 104 sending a Challenge-Handshake Authentication Protocol (CHAP) challenge to the access terminal 102. The CHAP challenge can include a CHAP ID and challenge value. Operation 708 can include the access terminal 102 responding to the CHAP challenge with a CHAP response. The CHAP response can include the CHAP ID, challenge response, and a network access identifier (NAI). In this regard, the NAI can be received in a CHAP response that can be sent by the access terminal 102 during a CHAO authentication procedure that can be performed during the session authentication phase. Operation 708 can correspond to an embodiment of operation 400 in which the identifier received by the roaming access network 104 is an NAI provided by the access terminal 102 during the session authentication phase of session establishment. Operation 710 can include the roaming access network 104 signaling success or failure of the CHAP procedure to the access terminal 102. It will be appreciated that the CHAP procedure illustrated in operations 706-710 is illustrated by way of example and not by way of limitation, as other authentication procedures/protocols can be substituted for CHAP in accordance with various embodiments.

Operation 712 can include the roaming access network 104 using the NAI to determine a roaming agreement between an operator of the roaming access network 104 and the home network associated with the access terminal 102. In this regard, the NAI can be indicative of a realm (e.g., the home network operator) associated with the access terminal 102. For example, the NAI can have the format user@realm such that the realm can be derived from the NAI. The roaming access network 104 can accordingly use the realm to look up the roaming agreement between the roaming access network operator and home network operator and determine one or more RAT versions covered by the roaming agreement. Operation 712 can, for example, correspond to an embodiment of operations 420-430.

The roaming access network 104 can determine if the session personality negotiated in operation 704 is compliant with the roaming agreement. In this regard, the session personality can be determined to be compliant with the roaming agreement if each RAT version defined by the session personality is covered by the roaming agreement. If each RAT version defined by the session personality is not covered by the roaming agreement such that the session personality is not compliant with the roaming agreement, then operation 714 can be performed. Operation 714 can include the access terminal 102 and roaming access network 104 performing a session modification/reconfiguration procedure in which a modified session personality that is compliant with the roaming agreement can be negotiated. Operation 714 can, for example, correspond to an embodiment of operation 430 in which a modified session personality can be negotiated following the session authentication phase. Operation 714 can be omitted in an instance in which the session personality negotiated in operation 704 is compliant with the roaming agreement.

Figure 8:
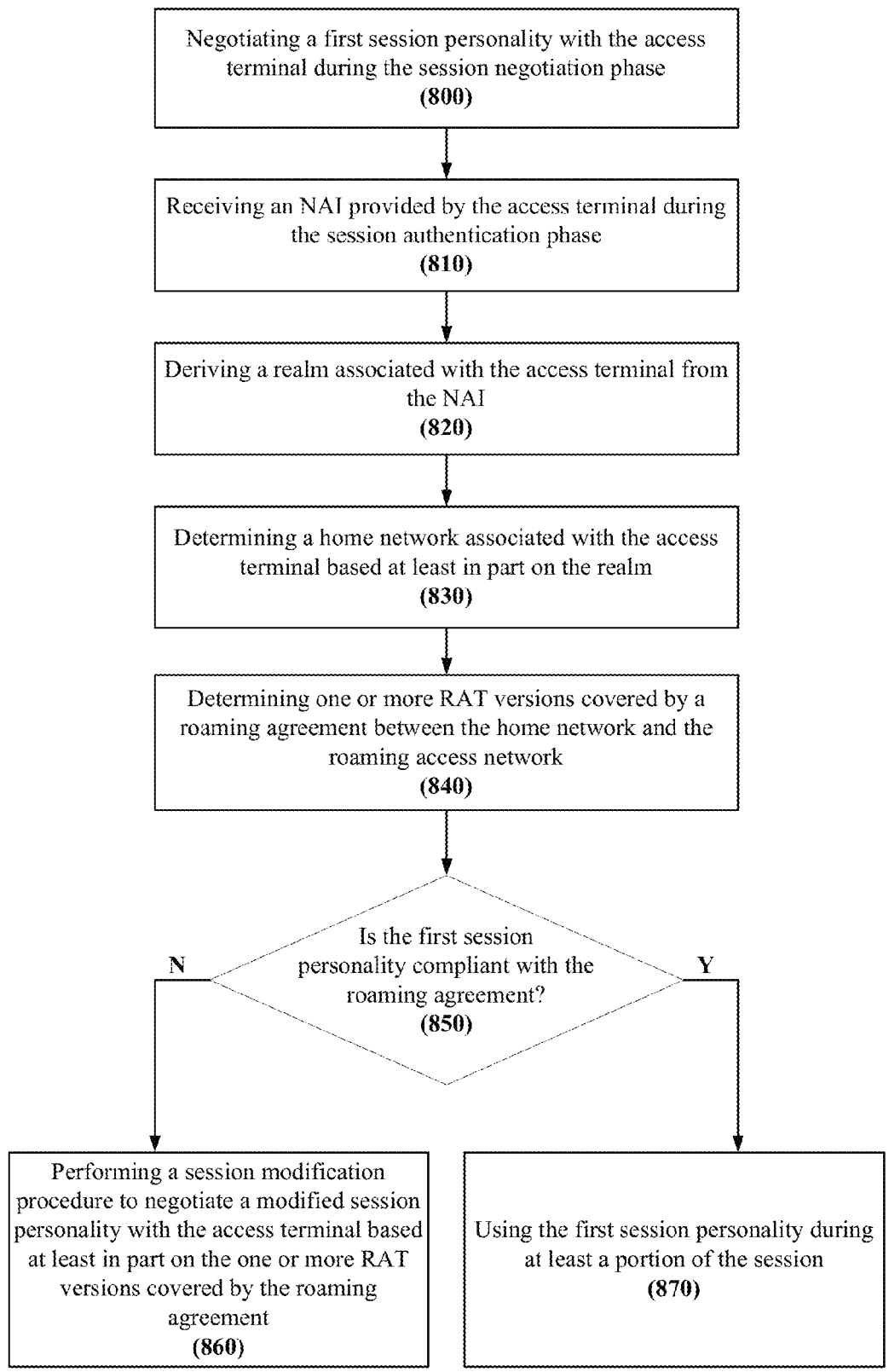
FIG. 8 illustrates a flowchart of a further example method for negotiating a session personality based at least in part on a roaming agreement according to some example embodiments.

FIG. 8 illustrates a flowchart of an example method for negotiating a session personality based at least in part on a roaming agreement according to some example embodiments. In this regard, FIG. 8 illustrates operations that can be performed by one or more network entities of the roaming access network 104 in accordance with performance of the method of FIG. 7. One or more of processing circuitry 310, processor 312, memory 314, communication interface 316, or session negotiation module 318 can, for example, provide means for performing one or more of the operations illustrated in and described with respect to FIG. 8.

Operation 800 can include the roaming access network 104 negotiating a first session personality with the access terminal 102 during the session negotiation phase. In this regard, operation 800 can correspond to an embodiment of operation 704.

Operation 810 can include the roaming access network 104 receiving an NAI provided by the access terminal 102 during the session authentication phase. The NAI can, for example, be provided by the access terminal 102 in a CHAP response. Operation 810 can, for example, correspond to an embodiment of operation 400 and/or operation 708.

Operation 820 can include the roaming access network 104 deriving a realm associated with the access terminal from the NAI. For example, if the NAI is in the format user@realm, the realm can be parsed or otherwise extracted from the NAI. Operation 830 can include the roaming access network 104 determining a home network associated with the access terminal based at least in part on the realm. In some example embodiments, the realm can be synonymous with the home network identity. Alternatively, in some example embodiments, the realm can have a defined association with the home network such that the home network corresponding to the realm can be determined. Operation 820-830 can, for example, correspond to an embodiment of operation 410 and/or operation 712.

Operation 840 can include the roaming access network 104 determining one or more RAT versions covered by a roaming agreement between the home network and the roaming access network. Operation 840 can, for example, correspond to an embodiment of operation 420 and/or operation 712.

Operation 850 can include the roaming access network 104 determining if the first session personality negotiated in operation 800 is compliant with the roaming agreement. In this regard, operation 850 can include determining whether each RAT version defined by the first session personality is covered by the roaming agreement.

If each RAT version defined by the session personality is not covered by the roaming agreement such that the session personality is not compliant with the roaming agreement, the method can proceed to operation 860, which can include performing a session modification procedure to negotiate a modified session personality with the access terminal based at least in part on the one or more RAT versions covered by the roaming agreement. Operation 860 can be performed following the session authentication phase. The modified session personality can define one or more RAT versions for use in the session. In accordance with some example embodiments, the negotiated RAT version(s) defined by the modified session personality are supported by both the access terminal 102 and the roaming access network 104 and are covered by the roaming agreement. Operation 860 can, for example, correspond to an embodiment of operation 430 and/or operation 714.

If, however, it is determined at operation 850 that the first session personality is compliant with the roaming agreement, operation 860 can be omitted, and the method can further include operation 870. Operation 870 can include the access terminal 102 and roaming access network 104 using the first session personality during at least a portion of the session.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for negotiating a session personality based at least in part on a roaming agreement, the method comprising a roaming access network:

receiving a hardware identifier (HardwareID) provided by an access terminal attendant to establishment of a session between the access terminal and the roaming access network, the HardwareID, being provided by the access terminal during a session setup phase of session establishment in which a Unicast Access Terminal Identifier

17

(UATI) for the session is assigned to the access terminal by the roaming access network;
using the HardwareID, to determine a home network associated with the access terminal;
determining one or more radio access technology (RAT) versions covered by roaming agreement between the home network and the roaming access network prior to negotiating the session personality in a session negotiation phase of session establishment;
negotiating the session personality with the access terminal during the session negotiation phase based at least in part on the one or more RAT versions covered by the roaming agreement; and
performing session authentication after completion of the session negotiation phase.

2. The method of claim 1, wherein using the HardwareID, to determine the home network associated with the access terminal comprises looking up the HardwareID, in a database to determine the home network associated with the HardwareID.

3. The method of claim 2, wherein the database is maintained by the roaming access network.

4. The method of claim 2, wherein the database is maintained external to the roaming access network and is accessible by multiple network operators.

5. The method of claim 1, wherein the session is an Evolution-Data Optimized (EV-DO) session.

6. The method of claim 5, wherein the one or more RAT versions defined by the session personality comprise one or more of EV-DO Release (Rel.) 0, EV-DO Revision (Rev.) A, EV-DO Rev. B, EV-DO Rev. C, or evolved High Rate Packet Data (eHRPD).

7. A method for negotiating a session personality, for a session between an access terminal and a roaming access network, based at least in part on a roaming agreement, the method comprising the roaming access network:
negotiating a first session personality with the access terminal during a session negotiation phase of a session establishment between the access terminal and the roaming access network;
receiving a network access identifier (NAI) provided by the access terminal during a session authentication phase of the session establishment, the session authentication phase occurring after the session negotiation phase;
deriving a realm associated with the access terminal from the NAI;
determining a home network associated with the access terminal based at least in part on the realm;
determining one or more radio access technology (RAT) versions covered by a roaming agreement between the home network and the roaming access network;
determining, based at least in part on the one or more RAT versions covered by the roaming agreement, that the first session personality is not compliant with the roaming agreement; and
performing a session modification procedure to negotiate, with the access terminal, a modified session personality compliant with the roaming agreement based at least in part on the one or more RAT versions covered by the roaming agreement.

8. The method of claim 7, wherein in an instance in which the first session personality is compliant with the roaming agreement, the session modification procedure is omitted and the first session personality is used during at least a portion of the session.

9. The method of claim 7, wherein receiving the NAI comprises receiving the NAI in a Challenge-Handshake Authentication Protocol (CHAP) response sent by the access terminal during a CHAP authentication procedure performed during the session authentication phase.

10. The method of claim 7, wherein the session is an Evolution-Data Optimized (EV-DO) session.

11. The method of claim 10, wherein the one or more RAT versions defined by the session personality comprise one or more of EV-DO Release (Rel.) 0, EV-DO Revision (Rev.) A, EV-DO Rev. B, EV-DO Rev. C, or evolved High Rate Packet Data (eHRPD).

12. The method of claim 7, wherein the roaming agreement is an inter-carrier roaming agreement between a first operator associated with the roaming access network and a second operator associated with the home network.

13. The method of claim 7, wherein the roaming agreement is an international roaming agreement.

14. A non-transitory computer readable medium storing instruction that, when executed by a processor in a roaming access network, cause the roaming access network to:
negotiate one or more session personalities based at least in part on a roaming agreement;
negotiate a first session personality with an access terminal during a session negotiation phase of a session establishment between the access terminal and the roaming access network;
receive a network access identifier (NAI) provided by the access terminal during a session authentication phase of the session establishment, the session authentication phase occurring after the session negotiation phase;
derive a realm associated with the access terminal from the NAI;
determine a home network associated with the access terminal based at least in part on the realm;
determine one or more radio access technology (RAT) versions covered by a roaming agreement between the home network and the roaming access network;
determine, based at least in part on the one or more RAT versions covered by the roaming agreement, that the first session personality is not compliant with the roaming agreement; and
perform a session modification procedure to negotiate, with the access terminal, a modified session personality compliant with the roaming agreement based at least in part on the one or more RAT versions covered by the roaming agreement.

15. The non-transitory computer readable medium of claim 14, wherein in an instance in which the first session personality is compliant with the roaming agreement, the session modification procedure is omitted and the first session personality is used during at least a portion of the session.

16. The non-transitory computer readable medium of claim 14, wherein receiving the NAI comprises receiving the NAI in a Challenge-Handshake Authentication Protocol (CHAP) response sent by the access terminal during a CHAP authentication procedure performed during the session authentication phase.

17. The non-transitory computer readable medium of claim 14, wherein the session is an Evolution-Data Optimized (EV-DO) session.

18. The non-transitory computer readable medium of claim 17, wherein the one or more RAT versions defined by the session personality comprise one or more of EV-DO Release (Rel.) 0, EV-DO Revision (Rev.) A, EV-DO Rev. B, EV-DO Rev. C, or evolved High Rate Packet Data (eHRPD).

19. The non-transitory computer readable medium of claim 14, wherein the roaming agreement is an inter-carrier roaming agreement between a first operator associated with the roaming access network and a second operator associated with the home network.

20. The non-transitory computer readable medium of claim 14, wherein the roaming agreement is an international roaming agreement.

* * * * *